March 5, 1929. S. C. HATFIELD 1,704,538
CORE FOR SINGLE TUBE TIRES
Filed Dec. 6, 1922
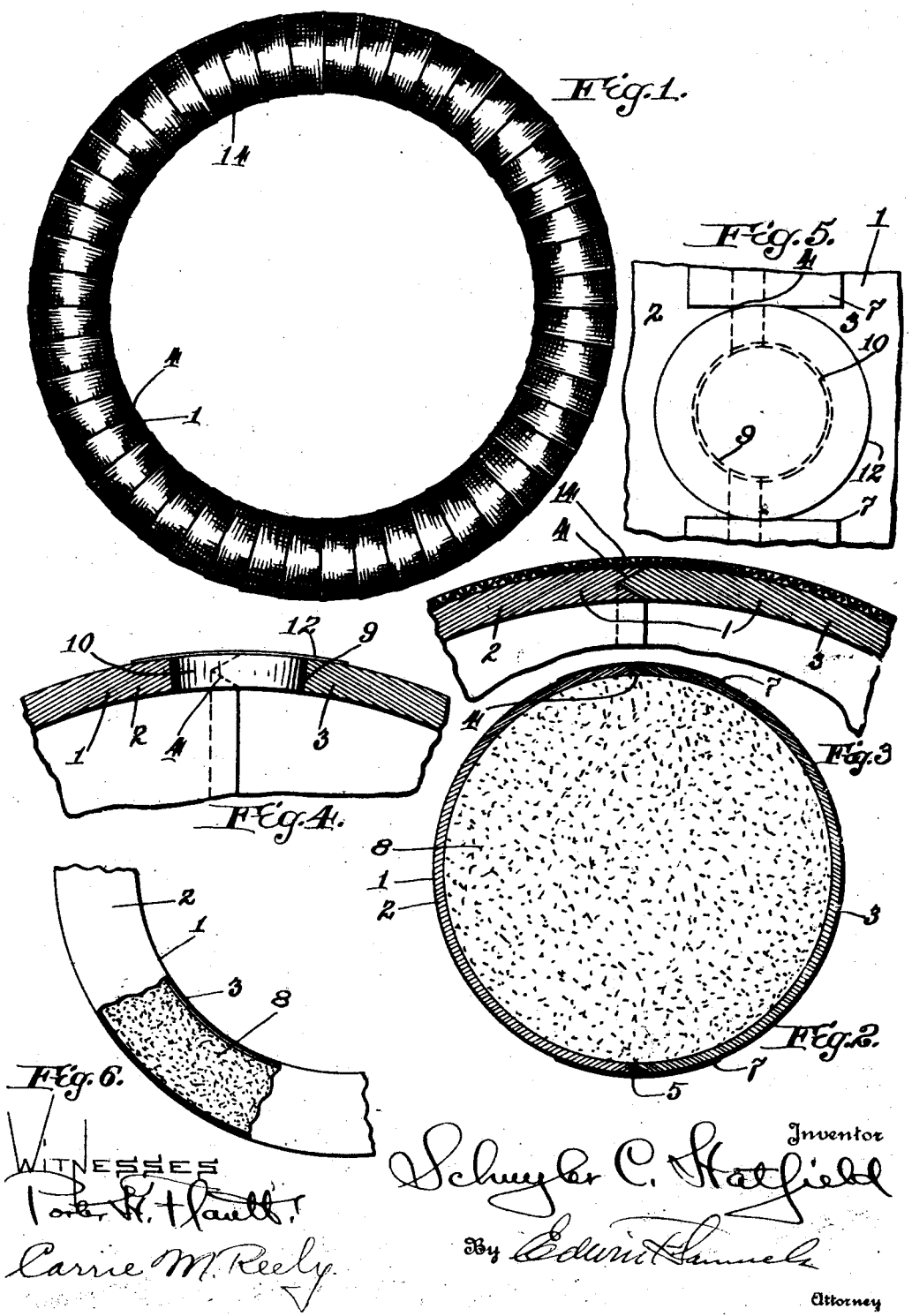

Patented Mar. 5, 1929.

1,704,538

UNITED STATES PATENT OFFICE.

SCHUYLER C. HATFIELD, OF BALTIMORE, MARYLAND.

CORE FOR SINGLE-TUBE TIRES.

Application filed December 6, 1922. Serial No. 605,171.

Resilient or elastic wheels composed of two separate, rigid members which consist of a hub member encircled by an outer or spoke member which is spaced from the hub, to provide for relative play and having a pneumatic pad between the hub member and the spoke member to take up the play and provide the resilient element, are described in several United States patents. The pad or pneumatic member is thus protected from wear and from punctures. This makes the ordinary tire structure consisting of an outer shoe to take up the wear and an inner tube or air chamber to be protected by the shoe unnecessary. A pad of the single tube variety, a form of which is well known in connection with bicycles, is cheaper, simpler and easier to handle. The type of tire made for bicycles is ordinarily of pure gum without fabric, a more substantial structure is necessary for the present purpose. The use of fabric or cord is deemed necessary.

In the manufacture of such a single tube tire or pad to serve as a hub tire or cushion providing the resilient element in elastic wheels of the type referred to, various difficulties are encountered and the production of a substantial structure of fabric rubber has been difficult to effect commercially.

The invention relates particularly to a core for use in the manufacture of such pads or tires and to the process of manufacture in so far as it has to do with the operation of such core, the object being to reduce expense and quicken the operation.

The core consists in the main of comminuted material as fine sand, preferably without adhesive properties, though material not unlike that used in the manufacture of foundry cores may be used. The term, comminuted material, as used herein is intended to include material composed of any size particles which can be removed from the finished pad or tire in the manner described and which may serve to support the core for the purposes herein outlined. So long as the adhesion between the particles is not so great as to prevent the core from being pulverized easily and without injury to the finished tire, so that it can be poured or shaken out through a small hole like a valve stem hole, it is not detrimental.

In the practice of the present invention the comminuted material is enclosed within a sectional casing of material which is sufficiently strong to support the core but which is soluble or otherwise capable of being easily disintegrated so that it may be thus dissolved or disintegrated and removed by washing or by some similar process. This material may be papier mâché, glue or shellac, rosin, or other gum or similar material soluble, or partially soluble, in water, gasoline, alcohol, or any other convenient solvent.

For convience in manufacture, the core casing is made in sections and in the instance of the annular core which is the variety illustrated, the casing which is separated into two sections divided by the central plane of revolution of the annulus when on the wheel, which is the central plane of revolution of the wheel. These two sections are made to fit together and in order to prevent them from being displaced when in use, an interlocking feature is provided. As shown, one edge is grooved and the cooperating edge is provided with a ridge to enter the groove.

Preferably the casing is provided with an opening through which core material may be introduced after the casing is assembled. To hold it in operative position, it may to advantage be wound with thin fabric to be removed from the tire when the tire is completed. This fabric is preferably wound helically about the casing starting near the opening and going around the casing until a point adjacent the opening on the other side is reached, when the casing is filled with core material and the wrapping completed, a suitable valve stem being first placed inside the core with the core material.

When the core thus completed, the tire or pad is formed by wrapping the core with fabric or cord and layers of unvulcanized rubber building the tire structure as desired and then vulcanizing as in the manufacture of tire shoes or casings in regular practice. When vulcanization is completed, a hole is cut for the valve tube, the comminuted material is shaken out through the holes, the core casing is washed out and the wrapping is withdrawn by means of a hook or in any other convenient manner.

In the accompanying drawing I have illustrated a core for use in the construction of single tube tires or pneumatic pads in accordance with my invention.

In the drawings:

Figure 1 is a side elevation of the completed core ready for the application thereto of the material forming the tire or pad.

Figure 2 is a transverse section on a radial plane including the axis of rotation of such pad or tire showing the core casing but not the wrapping;

Figure 3 is a fragmentary enlarged section through the core casing corresponding to Figure 2 showing the line of junction or joint between the casing members and also showing the wrapping;

Figure 4 is a similar fragmentary enlarged section through the core casing showing the filler hole;

Figure 5 is a fragmentary plan showing the core casing in the vicinity of the filler opening and the manner of closing the filler opening and the joints.

Figure 6 is a fragmentary side view of the casing without the wrapping corresponding to Figure 1.

Referring to the drawings by numerals, the structure shown consists of an annular casing 1 of circular transverse cross section as seen in Figure 2, the casing being also shown fragmentarily in side elevation in Figure 6. This casing is preferably of soluble or partially soluble material so that it can be reduced to liquid or pulp and washed out of the finished pad or tire by means of some convenient solvent. The casing is preferably divided into sections for convenience in manufacture. As shown, this sectional division is on the central plane at right angles to the axis of rotation, the casing being thus divided into two sections 2 and 3 which meet in tapering tongue and grooved joints 4 and 5 on the inner and outer peripheries respectively. The casing may be formed of glue, shellac, rosin or other soluble gum or any preferred soluble or partially soluble material.

The joints are preferably bridged by cover strips 7 and to prevent collapse the casing is filled with sand or other suitable comminuted material 8 which is introduced through a filler opening 9 which filler opening is closed by a plug 10 held in position by a flange or cover plate 12.

To support the casing and hold the parts thereof in registration it is when filled preferably wrapped spirally with a strip of fabric 14 which may be cheese cloth or other suitable material. This wrapping may to the best advantage be started at one side of the filler opening 9 before the comminuted material is introduced and carried around the annular casing, the entire casing being wrapped with the exception of a short space in the vicinity of the filler opening, the wrapping being discontinued when the opposite side of the opening from which the wrapping was started is reached, then the powdered material is introduced, the casing being filled and the plug having been inserted, the wrapping of the casing is completed which likewise completes the core.

When the core is thus completed the manufacture of the pad or tire casing may be undertaken at any convenient time. Outlined in a general way it consists in wrapping the tire material in layers about the core and then vulcanizing them. Alternate layers of fabric or cord and unvulcanized rubber are ordinarily used for this purpose. When the tire has been vulcanized an opening is cut for the valve stem which opening is utilized for the removal of the comminuted material in the core. The core casing is then washed out by means of a suitable solvent and the wrapping which is usually in the form of a strip of cheese cloth, is drawn out by means of a hook or other suitable implement.

I have thus described specifically and in detail a method of making tires and a core embodying my invention in order that the nature and operation of the same may be clearly understood, however, the specific terms herein are used descriptively rather than in a limiting sense, the scope of the invention being defined in the claims.

What I claim and desire to secure by Letters Patent is:

1. A core for single tube tires and the like which consists of a thin casing of highly soluble material which can be removed from the tube by washing, the said casing being filled with comminuted material.

2. A core for single tube tires and the like, to support the same from within during vulcanization, the core consisting of a casing of highly soluble material which can be removed from the tube by washing, and means capable of being removed through the valve opening of the tube for supporting the casing from within.

Signed by me at Baltimore, Maryland, this 28th day of November, 1922.

SCHUYLER C. HATFIELD.